F. B. GIESLER.
AUTOMATIC STROKE REGULATING DEVICE.
APPLICATION FILED JUNE 7, 1919.

1,417,986.

Patented May 30, 1922.
4 SHEETS—SHEET 1.

WITNESS:
J. P. Britt

INVENTOR.
F. B. Giesler
BY
Young & Young
ATTORNEYS

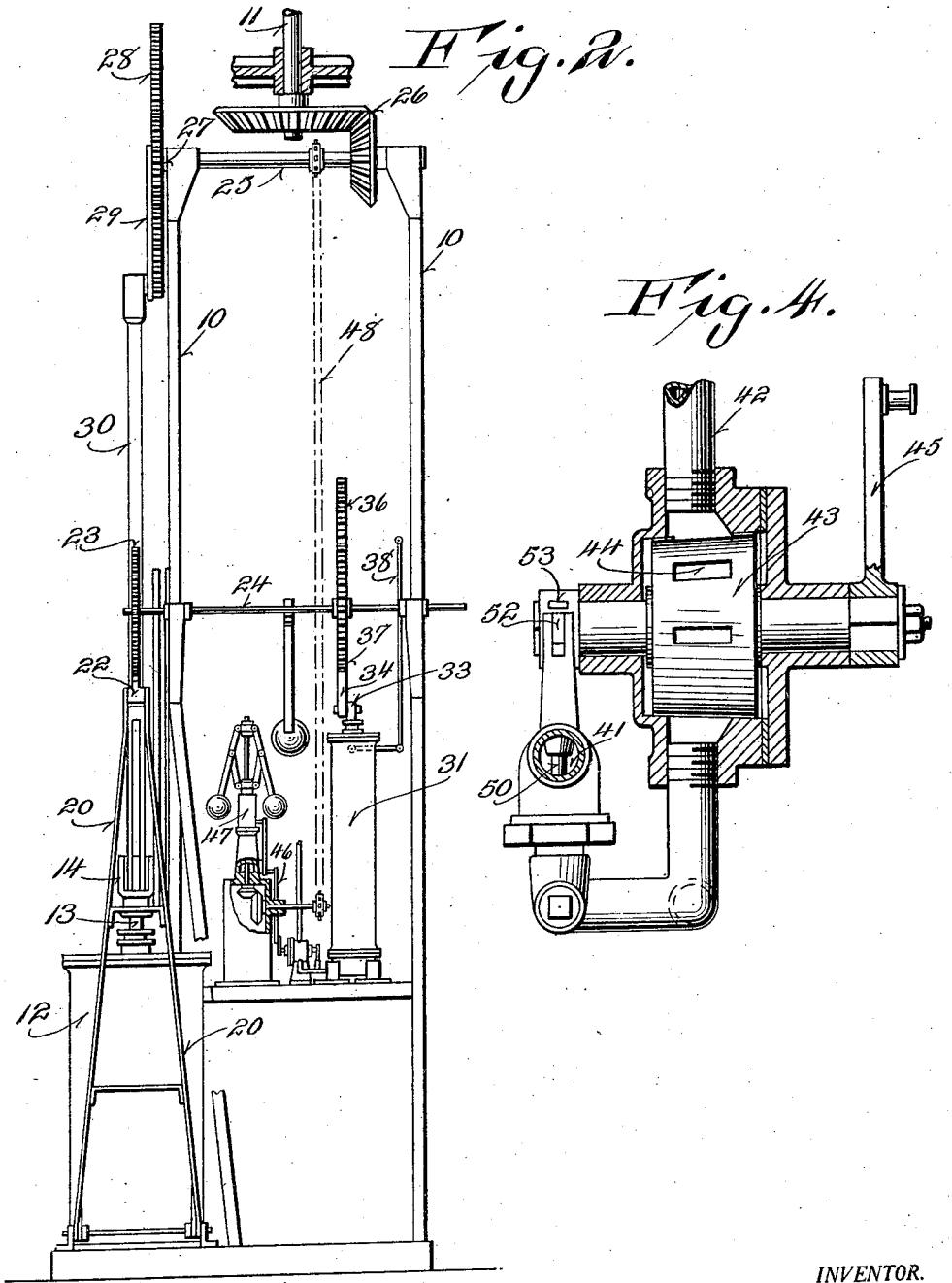

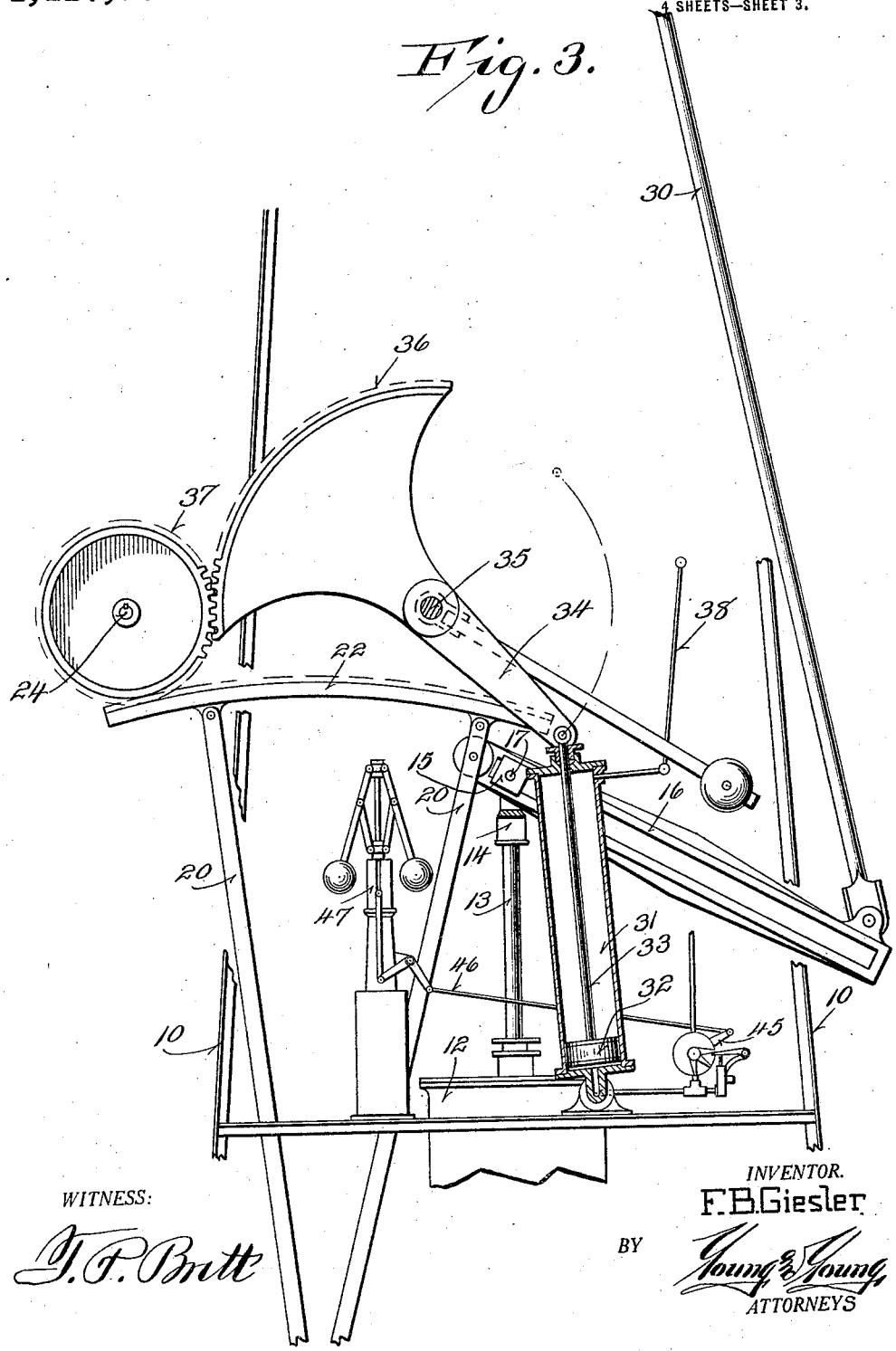

F. B. GIESLER.
AUTOMATIC STROKE REGULATING DEVICE.
APPLICATION FILED JUNE 7, 1919.

1,417,986.

Patented May 30, 1922.
4 SHEETS—SHEET 4.

WITNESS:
J. P. Britt

INVENTOR.
F. B. Giesler
BY
Young & Young
ATTORNEYS

UNITED STATES PATENT OFFICE.

FRANKLIN B. GIESLER, OF MILWAUKEE, WISCONSIN.

AUTOMATIC STROKE-REGULATING DEVICE.

1,417,986. Specification of Letters Patent. Patented May 30, 1922.

Application filed June 7, 1919. Serial No. 302,466.

*To all whom it may concern:*

Be it known that I, FRANKLIN B. GIESLER, a citizen of the United States, and resident of Milwaukee, in the county of Milwaukee and State of Wisconsin, have invented certain new and useful Improvements in Automatic Stroke-Regulating Devices; and I do hereby declare that the following is a full, clear, and exact description thereof.

My invention relates to new and useful improvements in power transmission devices, and has for its primary object the provision of a device for automatically changing the work capacity of a work mechanism in accordance with variations of the amount of power supplied to said mechanism, whereby to maintain a constant ratio of power and work, procuring a desired constant speed of operation of apparatus with which the device is connected, and also whereby to provide for the utilization in effective work of increased amounts of power which may be supplied from time to time.

It is more particularly the object of my invention to provide a device of this character which is adapted to connect a variable source of power such as a windmill, with a pump or other work mechanism whereby variation of the power supply is compensated by variation of the amount of work accomplished.

A more detailed object is to provide means for automatically changing the length of stroke of a reciprocating work member such as a pump piston upon variation of the amount of power supplied thereto.

A further and important object resides in the provision of an arrangement for integrating the stroke changing impulses procured by variation of the amount of power, whereby the stroke is changed in definite steps incidental to progressive variation of power to thus avoid objectionable continuous fluctuations of the stroke changing mechanism which would otherwise occur upon slight increases and decreases of power.

With the above and other objects and advantages in view, my invention resides more particularly in the novel combination, formation and arrangement of parts hereinafter described and particularly pointed out in the appended claims.

In the accompanying drawings,

Figure 2 is an end elevational view of the structure shown in Figure 1;

Figure 3 is an enlarged side elevational view of the stroke changing mechanism, portions being in section, and the parts being arranged to procure the minimum stroke of the pump;

Figure 4 is a detailed sectional view through the valve control means of the stroke changing mechanism;

Figure 1:
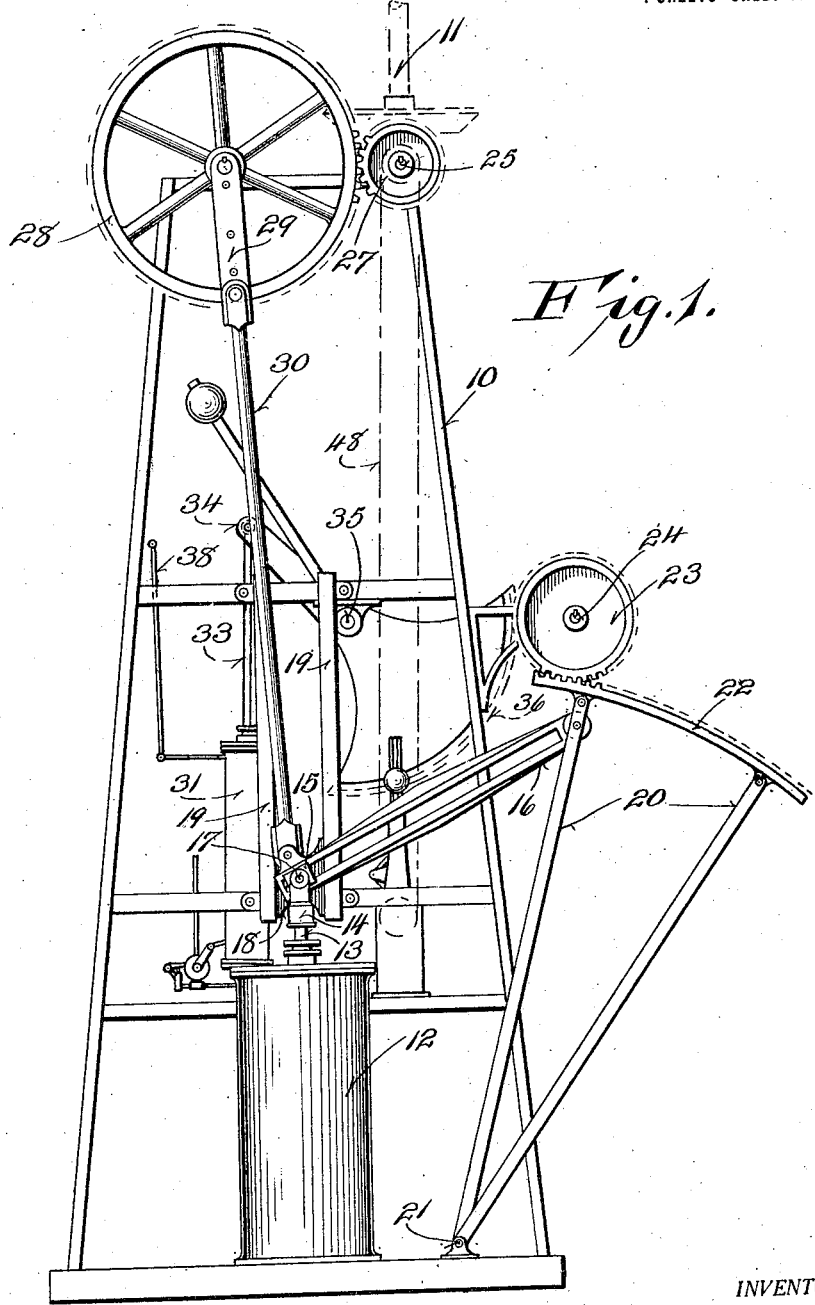
Figure 1 is a side elevational view of an automatic stroke changing mechanism embodying my invention and associated with the pump and frame structure of a windmill, the various parts being arranged in this figure to procure the maximum stroke of the pump.
Figure 5:
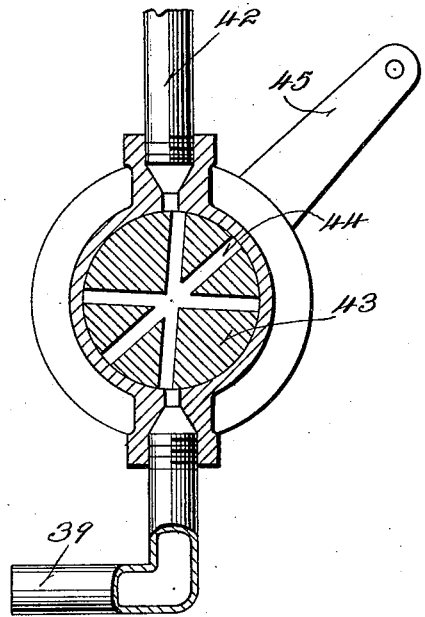
Figure 5 is a detailed sectional view through said control means in a plane at right angles to the plane of Figure 4.
Figure 6:
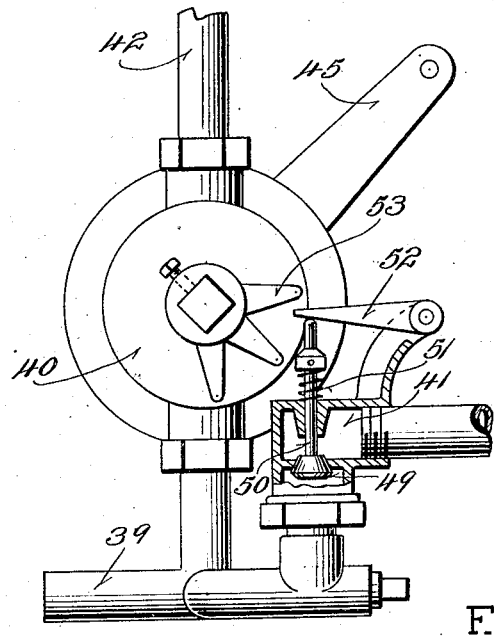
Figure 6 is an elevational view of said valve control means, with a portion thereof broken away.

Referring now more particularly to the accompanying drawings, the stroke changing mechanism constituting the present embodiment of my invention is supported by a framework 10 which constitutes the lower portion of the tower of a windmill forming a source of power variable in accordance with the change of wind velocities and including a depending rotary power shaft 11, the head structure of the windmill being not shown. A conventionally shown pump cylinder 12 is mounted in the lower portion of a framework and has disposed therein the usual pump piston (not shown) carried by a piston stem 13 which projects through the top of the cylinder and terminates in a yoke 14 in which is pivotally mounted a slide block 15 which is slidable in the longitudinal slot of a rock arm 16, the pivot pin 17 which connects the yoke and slide block being secured in a cross-head 18 and slidable between vertical tracks 19 to insure rectilinear travel of the piston stem 13. A shifting fulcrum is provided for one end of the rock arm 16, which is effected in the present instance by pivoting the end of the arm to one of a pair of bars 20 extending divergently upward from a fulcrum 21 on the frame base and carrying at their upper ends an arcuate gear rack 22 meshing with a gear wheel 23 carried on a shaft 24 at the side of the frame 10 whereby the fulcrum of the rock arm may be shifted.

For translating rotative movement of the windmill shaft 11 into reciprocating movement of the rock arm 16, a shaft 25 is mounted transversely on the frame 10 a considerable distance above the rock arm and this shaft is driven from the shaft 11 by intermeshing beveled gears 26. One end of the shaft 25 carries a gear-wheel 27 which meshes with a relatively large crank gear 28 journaled on the frame and carrying a radial crank-arm 29 to which is pivoted the upper end of a pitman link 30 which has its lower end pivoted to the end of the rock arm 16 remote from its fulcrum.

I have thus provided a simple and effective mechanism whereby rotation of the windmill shaft 11 procures reciprocating movement of the pump piston stem 13 in a manner which permits ready adjustment of the capacity of the pump by changing the length of stroke of the pump piston, this being effected simply by rotating the shaft 24 to shift the fulcrum of the rock arm 16 toward the piston rod 13 and simultaneously move the pitman connection away from the piston rod to decrease the leverage of the pitman link.

It is the usual practice to equip a windmill with a certain general size of pump, its piston area and stroke, or capacity, being determined by considering the minimum wind power available in the locality, and whichever excess of wind power would occur from time to time could not be utilized except by procuring an objectionably rapid operation of the structure.

By the mechanism described, the capacity of the pump may be readily varied to meet an increased supply of wind power and utilize the same to its fullest extent.

In the present structure, I procure this variation of the pump capacity automatically upon variation of the power supply, in a manner controlled by the speed at which the mechanisms are driven. Thus, I provide an upstanding fulcrumed cylinder 31 having a piston 32 slidable therein from which projects a stem 33 which has its upper end pivoted to a crank arm 34 on a horizontally journaled shaft 35 which carries a gear segment 36 meshing with a gear-wheel 37 on the shaft 24 which controls the shifting fulcrum of the rock-arm 16. The piston is normally urged to the bottom of the cylinder, thus procuring a minimum stroke of the piston stem 13, as shown in Figure 3, by fluid pressure conveyed through a hinge jointed pipe line 38 connected with the top of the cylinder and extending to any suitable source of supply. For raising the piston to increase the stroke, a pipe 39 extends from the lower end of the cylinder and is branched, one branch extending to an inlet valve casing 40, while the other branch extends to an outlet valve casing 41 adapted to permit free discharge of pressure fluid from the cylinder. A pipe 42 extends from the inlet valve casing 40 to a suitable source of supply which affords a considerably greater pressure than the source of supply for the pipe line 38 communicating with the top of the cylinder, such sources of supply preferably comprising tanks of water (not shown) disposed at the proper elevations to procure the necessary pressure heads in the cylinder 31. A cylindrical valve member 43 is rotatably mounted in the casing 40, and is provided with a series of, in the present instance three, intersecting ports 44 extending diametrically therethrough and regularly spaced. The valve member 43 is provided with journal pintles extending outwardly of the casing, and a crank arm 45 is fixed on one of these pintles and is connected by a link 46 with the operating lever of a preferably conventional governor mechanism 47 which is driven by a sprocket connection 48 with the power shaft 25. Thus, as the speed of the governor increases due to increase of power by greater wind velocity, the valve 43 will be rotated to successively bring its ports in registry with the ports of the valve casing 40 to admit fluid pressure at successive intervals to the bottom of the cylinder 31 to thus raise the piston and vary the pump stroke in successive stages. The surfaces between the ports 44 of the valve 43 close the ports of the casing and thus integrate the stroke shifting impulses of the governor into definite steps. To relieve pressure in the cylinder 31 and permit lowering of the piston as the speed of the governor decreases, a valve member 49 is disposed in the casing 41 and is carried by a stem 50 rising from the casing, the valve being normally held closed by a spring 51. A dog 52 is pivoted adjacent the stem 50 and normally rests thereon, and this dog is engageable by radial projections 53 on one of the valve pintles. When the valve member 43 rotates in one direction, the projections 53 merely trip past the dog, and when the valve member rotates in the other direction said projections successively engage the dog to rock the same and depress the valve stem 50 to open the valve member 49 and thus permit the piston 32 of the cylinder 31 to travel downwardly, this travel of the piston reducing the length of stroke, and being effected by pressure introduced in the top of the cylinder 31 through the hinge jointed pipe line 38.

When the device is not in operation, the end valve projection 53 rests on the dog 52 as shown particularly in Figure 3, thus opening the valve 49 and maintaining the structure at its shortest stroke length. As operation of the mechanism, and consequent centrifugal action of the governor 47 commences, the valve member 43 will be shifted and when the mechanism passes its desired maximum speed, the first port 44 of the valve member 43 will be brought into registry with the casing port and fluid will be admitted to the cylinder 31 to raise the piston 32 and increase the length of the pump stroke, consequently increasing the capacity of the pump and the work accomplished, which, in turn, would decrease the speed of operation. Should additional power be generated, the valve member 43 will again be shifted to bring the second port 44 in registry and a further increase of the pump stroke will be effected. While I have shown a mechanism adapted to procure three steps in raising and lowering the speed, it is obvious that any number of steps may be employed, determined by the number of ports 44 and valve stem projections 53 which are provided.

It will be further appreciated that various changes and modifications of structure may be employed within the scope of the appended claims without departing in any manner from the spirit of my invention.

What is claimed is:

1. The combination with a driven power member and a reciprocating member in drive connection therewith of a centrifugal governor driven with said members and fluid pressure means operable by said governor for varying the stroke of the reciprocating member.

2. A variable transmission mechanism including a reciprocating member, a rocking member in slidable pivot connection therewith, means for rocking said rocking member, a shiftable fulcrum for said rocking member including a pivoted frame, an arcuate gear rack carried by said frame, a shaft, a gear on said shaft meshing with said gear rack and means for rotating the shaft to shift the fulcrum of the rocking member.

3. A variable transmission mechanism including a reciprocating member, a rocking member in slidable pivot connection therewith, means for rocking said rocking member, a shiftable fulcrum for said rocking member including a pivoted frame, an arcuate gear rack carried by said frame, a shaft, a second shaft in drive connection with the first shaft, a crank arm on the second shaft, a fulcrumed cylinder, a piston slidable in said cylinder, a stem on the piston connected with the crank arm and means for introducing pressure fluid in the cylinder to move the piston whereby to shift the fulcrum of the rocking member.

4. The combination with a driven power member and the reciprocating member in drive connection therewith of a governor driven by one of said members and fluid pressure means operable in successive steps by said governor for varying the stroke of the reciprocating member.

5. A variable transmission device comprising a reciprocating member, a rocking member in slidable pivot connection therewith, means for rocking said rocking member, a governor driven by said means, a shiftable fulcrum for said rocking member, a cylinder, a piston in the cylinder connected with said shiftable fulcrum, means urging the piston in one direction of movement, means controlled by the governor for introducing fluid into the cylinder to move the piston in its other direction of movement and means controlled by the governor for releasing fluid from the cylinder.

In testimony that I claim the foregoing I have hereunto set my hand at Milwaukee, in the county of Milwaukee and State of Wisconsin.

FRANKLIN B. GIESLER.